United States Patent
Torama et al.

(10) Patent No.: US 10,446,155 B2
(45) Date of Patent: Oct. 15, 2019

(54) VOICE RECOGNITION DEVICE

(71) Applicant: Mitsubishi Electric Corporation, Tokyo (JP)

(72) Inventors: Ryosuke Torama, Tokyo (JP); Takumi Takei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/076,439

(22) PCT Filed: Feb. 26, 2016

(86) PCT No.: PCT/JP2016/055870
§ 371 (c)(1),
(2) Date: Aug. 8, 2018

(87) PCT Pub. No.: WO2017/145373
PCT Pub. Date: Aug. 31, 2017

(65) Prior Publication Data
US 2019/0051306 A1 Feb. 14, 2019

(51) Int. Cl.
| | |
|---|---|
| *G10L 15/00* | (2013.01) |
| *G10L 17/00* | (2013.01) |
| *G10L 15/10* | (2006.01) |
| *G10L 15/22* | (2006.01) |
| *G06F 3/16* | (2006.01) |
| *G06F 17/27* | (2006.01) |
| *G10L 15/02* | (2006.01) |

(52) U.S. Cl.
CPC .............. *G10L 17/00* (2013.01); *G06F 3/167* (2013.01); *G06F 17/277* (2013.01); *G10L 15/00* (2013.01); *G10L 15/02* (2013.01); *G10L 15/10* (2013.01); *G10L 15/22* (2013.01)

(58) Field of Classification Search
CPC ....... G10L 17/00; G10L 15/02; G06F 17/277; G06F 3/167
USPC .......................... 704/231, 246, 251, 257, 275
See application file for complete search history.

(56) References Cited

U.S. PATENT DOCUMENTS

2007/0055529 A1* 3/2007 Kanevsky ........... G10L 15/1822
704/275

FOREIGN PATENT DOCUMENTS

| JP | 2001-34289 A | 2/2001 |
|---|---|---|
| JP | 2008-14818 A | 1/2008 |
| JP | 2010-55375 A | 3/2010 |

OTHER PUBLICATIONS

International Search Report (PCT/ISA/210) issued in PCT/JP2016/055870, dated May 10, 2016.

* cited by examiner

*Primary Examiner* — Thierry L Pham
(74) *Attorney, Agent, or Firm* — Birch, Stewart, Kolasch & Birch, LLP (57) ABSTRACT

Disclosed is a voice recognition device (10) including: a voice recognition unit (11) for recognizing a user's uttered voice; a function performing unit (12) for performing a function corresponding to a recognition result provided by the voice recognition unit (11); a performance degree calculating unit (13) for calculating a degree to which the function performing unit (12) can perform the function corresponding to the recognition result; and a control unit (15) for, when the degree calculated by the performance degree calculating unit (13) is equal to or greater than a predetermined first reference, causing the function performing unit (12) to perform the function corresponding to the recognition result.

12 Claims, 6 Drawing Sheets

| Performance Degree Definition | | | Operation |
|---|---|---|---|
| Verb | Object | Degree of Performance | |
| ○ | ○ | 3 | Performance of Function |
| ○ | × | 2 | Inquiry about Additional Information |
| × | ○ | 1 | Presentation of Function Candidates |
| × | × | 0 | Non-Performance of Function |

VOICE RECOGNITION DEVICE

TECHNICAL FIELD

The present invention relates to a voice recognition device that recognizes a user's utterance.

BACKGROUND ART

In Patent Literature 1, an actuation control device that recognizes a voice at all times and generates a shortcut button for performing a function corresponding to a recognition result, and displays the shortcut button is described.

CITATION LIST

Patent Literature

Patent Literature 1: Japanese Unexamined Patent Application Publication No. 2008-14818

SUMMARY OF INVENTION

Technical Problem

The actuation control device according to above-mentioned Patent Literature 1 is configured so as to perform the function corresponding to the recognition result when receiving the user's operation on the shortcut button. Therefore, any function can be prevented from being performed freely against the user's intention.

However, a problem is that even when the user utters with an intention of performing a function, the utterance cannot cause the function to be immediately performed and an operation on a corresponding shortcut button is needed. Therefore, this makes the user feel annoyed.

The present invention is made in order to solve the above-mentioned problem, and it is therefore an object of the present invention to provide a voice recognition device that simplifies a user's operation when the user's operational intention is clear, and that prevents a malfunction from occurring when the user's operational intention is not clear.

Solution to Problem

A voice recognition device according to the present invention, includes: a voice recognizer to recognize a user's uttered voice; a function performer to perform a function corresponding to a recognition result provided by the voice recognizer; a performance degree calculator to calculate a degree to which the function performer can perform the function corresponding to the recognition result; controller to, when the degree calculated by the performance degree calculator is equal to or greater than a predetermined first reference which is used for determining whether there is sufficient information required for the function performance to perform the function, cause the function performer to perform the function corresponding to the recognition result; a determiner to determine presence or absence of a user's operational intention by using the recognition result provided by the voice recognizer; and an inquiry controller to make an inquiry to a user, wherein when the degree calculated by the performance degree calculator is greater than a predetermined second reference less than the first reference and is less than the first reference, the inquiry controller changes content of the inquiry in accordance with a determination result provided by the determiner, and wherein when the determiner determines that there is an operational intention, the inquiry controller makes an inquiry about information required for the function performer to perform the function.

Advantageous Effects of Invention

According to the present invention, it is configured so as to, when the degree to which the function corresponding to the recognition result can be performed is equal to or greater than the first reference, determine that the user's operational intention is clear, thereby performing the function, and thus the user can cause the function to be performed by giving utterance once. In contrast, when the degree to which the function corresponding to the recognition result can be performed is less than the first reference, it is determined that the user's operational intention is not clear and it is therefore possible to make use for prevention of a malfunction.

DESCRIPTION OF EMBODIMENTS

Hereafter, in order to explain this invention in greater detail, embodiments of the present invention will be described with reference to the accompanying drawings.

Embodiment 1

Figure 1:
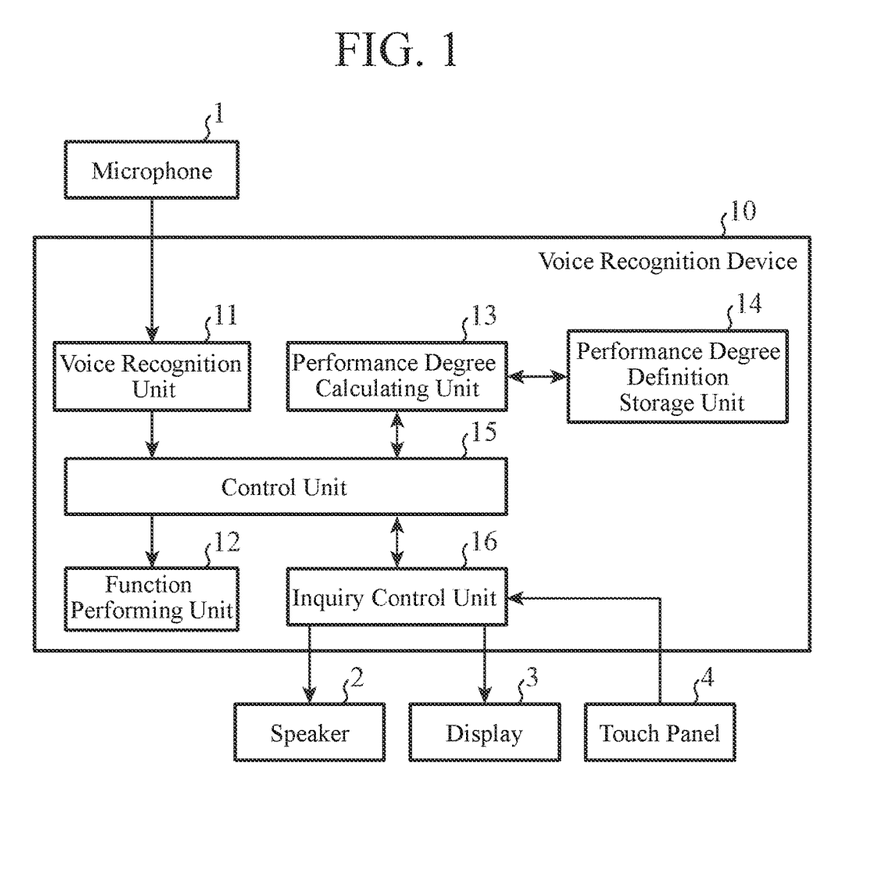
FIG. 1 is a block diagram showing an example of the configuration of a voice recognition device according to Embodiment 1 of the present invention.

FIG. 1 is a block diagram showing an example of the configuration of a voice recognition device 10 according to Embodiment 1 of the present invention. The voice recognition device 10 shown in FIG. 1 includes a voice recognition unit 11 that recognizes a user's uttered voice, a function performing unit 12 that performs a function corresponding to a recognition result provided by the voice recognition unit 11, a performance degree calculating unit 13 that calculates a degree to which the function performing unit 12 can perform the function corresponding to the recognition result, a performance degree definition storage unit 14 that stores a performance degree definition used for the calculation of the degree, a control unit 15 that causes the function performing unit 12 to perform the function corresponding to the recognition result when the degree calculated by the performance degree calculating unit 13 is equal to or greater than a predetermined first reference, and an inquiry control unit 16 that makes an inquiry to the user.

Further, a microphone 1, a speaker 2, a display 3, and a touch panel 4 are connected to the voice recognition device 10. Herein, although both a voice input using the microphone 1 and the touch panel 4 provided on the display 3 are illustrated as an input device that receives a user's operation, it is not limited to such a case and hardware keys or the like can be alternatively used.

Hereafter, each embodiment of the present invention will be explained using an example in which the voice recognition device 10 is mounted in a vehicle. It is assumed that the function performing unit 12 performs a function of vehicle-mounted equipment such as car navigation, car audio, or a car air conditioner.

The microphone 1 captures a voice uttered by a user and outputs voice data to the voice recognition unit 11.

The voice recognition unit 11 receives the voice data from the microphone 1, and detects a voice section corresponding to content which the user has uttered. Hereafter, a voice section corresponding to content which a user has uttered is referred to as an "utterance section." The voice recognition unit 11 then extracts a feature quantity of the voice data in the utterance section, performs recognition processing using a not-illustrated voice recognition dictionary or the like on the basis of the feature quantity, and outputs a recognition result to the control unit 15. Here, as a voice recognition method, word recognition based on grammar, keyword spotting, large vocabulary continuous speech recognition, or any other well-known method can be used.

Further, the voice recognition unit 11 can perform an intention estimating process by using the recognition result. In this case, for example, the voice recognition unit 11 estimates the user's intention by using both a recognition result acquired using the large vocabulary continuous speech recognition, and a model for intention estimation, and outputs the intention estimated thereby as a recognition result. When the user utters "I want to go to the city office", the intention estimation result is "Set the city office as the destination." Because a well-known method can be used as an intention estimating method, an explanation of the method will be omitted hereafter.

In a voice recognition device mounted in a car navigation device or the like, it is typical that a user clearly expresses a start of utterance to the car navigation device. Therefore, a button for providing an instruction to start voice recognition is displayed on a display equipped with a touch panel, or is provided for a steering wheel. Hereafter, the button for providing an instruction to start voice recognition, or the like is referred to as a "voice recognition start instructing unit." Then, the voice recognition device recognizes a voice which a user utters after operating the voice recognition start instructing unit.

The voice recognition unit 11 according to each embodiment of the present invention can, after such an instruction to start voice recognition as above is provided by a user, detect an utterance section from voice data from the microphone 1 and perform recognition processing. As an alternative, the voice recognition unit 11 can, during a predetermined voice acquisition time period, detect an utterance section from voice data from the microphone 1 and perform recognition processing, even though no instruction to start voice recognition is provided. It is assumed that in the predetermined voice acquisition time period, for example, a time period extending from a time when the voice recognition device 10 starts or restarts to a time when the voice recognition device ends or stops, a time period during which the voice recognition unit 11 operates, or the like is included.

The function performing unit 12 performs a function which the function performing unit is instructed to perform by the control unit 15. It is assumed that a function which the function performing unit 12 can perform is, for example, a function associated with the car navigation, the car audio, or the car air conditioner which is mentioned above.

The performance degree calculating unit 13 receives the recognition result provided by the voice recognition unit 11 from the control unit 15. The performance degree calculating unit 13 then calculates the degree to which a function corresponding to the recognition result can be performed, by reference to the performance degree definition storage unit 14, and outputs a result of the calculation of the degree of performance to the control unit 15. Hereafter, the degree to which the function corresponding to the recognition result can be performed is referred to as the "degree of performance".

The degree of performance shows, in levels, whether or not the recognition result provided by the voice recognition unit 11 can be brought into correspondence with a function which the function performing unit 12 can perform, and whether or not information required for the function performing unit 12 to perform the function is sufficient. The information required to perform is an object which will be mentioned later, and is, for example, information for specifying a piece of music such as a "music title", an "artist name", or an "album name", in a music piece search function for car audio.

The performance degree definition storage unit 14 stores a performance degree definition which the performance degree calculating unit 13 uses for the calculation of the degree of performance. Here, an example of correspondence between the degrees of performance of a function and operations which the voice recognition device 10 performs is shown in FIG. 2.

Figure 2:
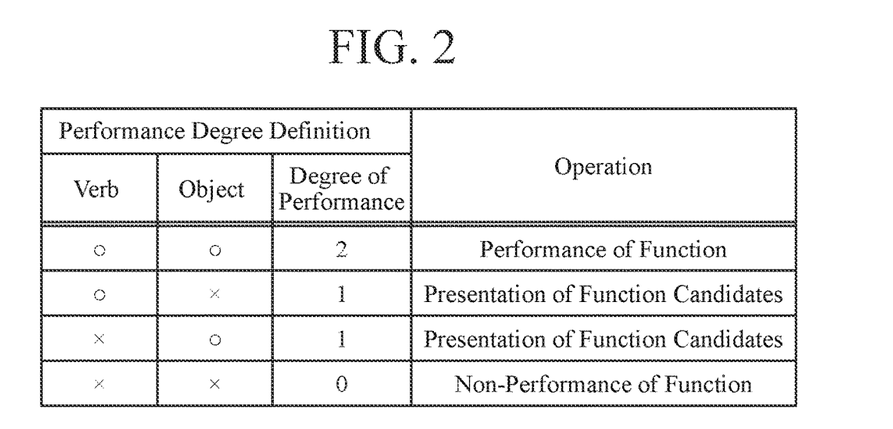
FIG. 2 is a diagram showing correspondence between degrees of performance and operations in Embodiment 1.

In an example shown in FIG. 2 of the "performance degree definition", values of the degree of performance each corresponding to both the presence or absence of a verb which is a word showing an operation of a function, and the presence or absence of an object which is a word showing the purpose of the function are defined in advance in the performance degree definition storage unit 14. It is assumed that the higher a value of the degree of performance is, the higher the degree to which the function performing unit 12 can perform the function is. Each "operation" shown in FIG. 2 will be mentioned later.

The performance degree calculating unit 13 refers to the performance degree definition shown in FIG. 2, and calculates the degree of performance in accordance with the presence or absence of a verb and the presence or absence of an object in the recognition result. For example, when a verb "want to go" and an object "city office" exist, such as when the recognition result is "I want to go to the city office", the performance degree calculating unit 13 calculates the degree of performance as "2."

The performance degree calculating unit 13 can simply extract only a verb and an object, or take the meaning of the dependency between a verb and an object into consideration. For example, when the combination of a verb "want to eat" and an object "city office" does not make sense, such as when the recognition result is "I want to eat the city office", the performance degree calculating unit 13 extracts only the verb and calculates the degree of performance as "1."

The above-mentioned method is only an example, and, as another calculating method, the degree of performance can be calculated by using, for example, likelihood provided by a technique for estimating the meaning of a sentence.

Further, the performance degree definition storage unit 14 can store a definition of correspondence between key words and values of the degrees of performance, instead of the performance degree definition shown in FIG. 2. Concretely, a degree of performance of "1" is brought into correspondence with each verbal keyword such as "want to go", a degree of performance of "1" is brought into correspondence with each objective key word such as "city office", and a degree of performance "2" is brought into correspondence with each key word including both a verb and an object, such as "want to go to the city office."

The control unit 15 receives the recognition result from the voice recognition unit 11 and outputs the recognition result to the performance degree calculating unit 13, and causes the degree of performance to be calculated.

The control unit 15 receives a result of the calculation of the degree of performance from the performance degree calculating unit 13, determines the next operation in accordance with the calculation result, and provides an instruction to perform the operation for the function performing unit 12 or the inquiry control unit 16. It is assumed that in order to determine the operation corresponding to the degree of performance, a first reference and a second reference which is less than the first reference are predetermined for the control unit 15.

The first reference is used for determining whether or not there is sufficient information required for the function performing unit 12 to perform the function, and, for example, the first reference is the degree of performance of "2" in the example of FIG. 2. In the voice recognition device 10 according to Embodiment 1, when the degree of performance is equal to or greater than the first reference, it is determined that the user's intention of operating vehicle-mounted equipment is clear, whereas when the degree of performance is less than the first reference, it is determined that the user's intention of operating vehicle-mounted equipment is not clear.

The second reference is used for determining whether or not there is no information required to perform a function because the recognition result provided by the voice recognition unit 11 cannot be brought into correspondence with the function which the function performing unit 12 can perform, and, for example, the second reference is the degree of performance of "0" in the example of FIG. 2.

When the degree of performance is equal to or greater than the first reference of "2", the control unit 15 outputs an instruction to cause the function corresponding to the recognition result to be performed to the function performing unit 12. It is assumed that correspondence between verbs and functions is defined in advance in the control unit 15. For example, the control unit 15 outputs an instruction which indicates, as the function corresponding to the recognition result "I want to go to the city office", a setting of the city office as the destination, to the function performing unit 12.

When the degree of performance is less than the first reference of "2", the control unit 15 does not allow the function corresponding to the recognition result to be performed immediately.

For example, when the degree of performance is greater than the second reference of "0" and is less than the first reference of "2", the control unit 15 instructs the inquiry control unit 16 to present function candidates corresponding to the recognition result to the user, and make an inquiry about which function is to be performed. Each function candidate corresponding to the recognition result is, for example, a function brought into correspondence with a verb existing in the recognition result, or a function which uses an object existing in the recognition result as a parameter. For example, when the recognition result is only a verb "increase", the control unit 15 defines a map enlarging function for car navigation, a sound volume changing function for car audio, a temperature changing function for car air conditioner, and so on which correspond to this verb, as candidates. The control unit 15 then receives a result of the inquiry from the inquiry control unit 16 or the like, and outputs an instruction to cause the function selected by the user to be performed to the function performing unit 12.

Further, for example, when the degree of performance is equal to or less than the second reference of "0", the control unit 15 neither performs the function corresponding to the recognition result, nor presents function candidates.

The inquiry control unit 16 receives the instruction to present the function candidates and make an inquiry, from the control unit 15. The inquiry control unit 16 can output the function candidates from the speaker 2 by voice, display the candidates on the display 3, or output the candidates from the speaker 2 by voice while displaying the candidates on the display 3. The inquiry control unit 16 then receives information which the user has inputted by operating the input device such as the touch panel 4, and outputs the function which the user has selected from among the candidates to the control unit 15 as an inquiry result. The user's operation can be received using the input device such as the touch panel 4, or can be received using a voice input through the microphone 1 and the voice recognition unit 11.

Next, the operation of the voice recognition device 10 according to Embodiment 1 will be explained using a flowchart of FIG. 3. The voice recognition device 10 performs the processing shown in the flowchart of FIG. 3 during the above-mentioned predetermined voice acquisition time period.

In step ST1, the voice recognition unit 11 receives voice data from the microphone 1, detects an utterance section and performs recognition processing, and outputs a recognition result to the control unit 15. The control unit 15 receives the recognition result from the voice recognition unit 11, and outputs the recognition result to the performance degree calculating unit 13.

In step ST2, the performance degree calculating unit 13 receives the recognition result from the control unit 15, and calculates the degree of performance of a function corresponding to the recognition result by reference to the performance degree definition storage unit 14. The performance degree calculating unit 13 outputs a result of the calculation of the degree of performance to the control unit 15.

In step ST3, the control unit 15 receives the result of the calculation of the degree of performance from the performance degree calculating unit 13. When the degree of performance is equal to or greater than the first reference of "2" ("YES" in step ST3), the control unit 15 advances to step ST7 and outputs an instruction to cause the function corresponding to the recognition result to be performed to the function performing unit 12. The function performing unit 12 performs the function corresponding to the recognition result in accordance with the instruction from the control unit 15.

In contrast, when the degree of performance is less than the first reference of "2" ("NO" in step ST3), the control unit 15 advances to step ST4.

In step ST4, when the degree of performance is equal to or less than the second reference of "0" ("YES" in step ST4), the control unit 15 ends the processing.

In contrast, when the degree of performance is greater than the second reference of "0" ("NO" in step ST4), the control unit 15 advances to step ST5 and instructs the inquiry control unit 16 to present function candidates corresponding to the recognition result and make an inquiry. The inquiry control unit 16 presents the function candidates by using the speaker 2 or the display 3, in accordance with the instruction from the control unit 15.

In step ST6, when the user selects a desired function from among the presented candidates by operating the touch panel 4, the touch panel 4 outputs the selected function, as a result of the inquiry, to the inquiry control unit 16. The inquiry control unit 16 receives the inquiry result from the touch panel 4, and outputs the inquiry result to the control unit 15.

When the user alternatively selects a desired function from among the presented candidates by giving utterance, the voice recognition unit 11 receives voice data about this utterance via the microphone 1, detects an utterance section and performs recognition processing, and outputs a recognition result, as a result of the inquiry, to the control unit 15.

When receiving the inquiry result from either the inquiry control unit 16 or the voice recognition unit 11 ("YES" in step ST6), the control unit 15 advances to step ST7 and outputs an instruction to cause the function selected by the user to be performed to the function performing unit 12. The function performing unit 12 performs the function selected by the user in accordance with the instruction from the control unit 15.

In contrast, when an inquiry result is notified from neither the inquiry control unit 16 nor the voice recognition unit 11 before a predetermined time period elapses after the inquiry control unit 16 has been instructed to present the candidates ("NO" in step ST6), the control unit 15 ends the processing. At that time, the inquiry control unit 16 ends the display of the function candidates in the display 3.

As mentioned above, the voice recognition device 10 according to Embodiment 1 is configured so as to include the voice recognition unit 11 that recognizes a user's uttered voice, the function performing unit 12 that performs a function corresponding to a recognition result provided by the voice recognition unit 11, the performance degree calculating unit 13 that calculates the degree to which the function performing unit 12 can perform the function corresponding to the recognition result, and the control unit 15 that causes the function performing unit 12 to perform the function corresponding to the recognition result when the degree calculated by the performance degree calculating unit 13 is equal to or greater than the predetermined first reference. When the degree of performance of the function corresponding to the recognition result is equal to or greater than the first reference, it is determined that the user's operational intention is clear and then the function is performed, thereby making it possible for the user to cause the function to be performed only by giving utterance. In contrast, when the degree of performance of the function corresponding to the recognition result is less than the first reference, it is determined that the user's operational intention is not clear, thereby enabling use for prevention of a malfunction different from the user's intention.

Further, the voice recognition device 10 according to Embodiment 1 is configured so as to include the inquiry control unit 16 that presents candidates for a function which is based on the recognition result and which the function performing unit 12 can perform. Further, the control unit 15 is configured so as to cause the function performing unit 12 to perform a function which is selected by the user from among the function candidates presented by the inquiry control unit 16. As a result, the user can cause the function to be performed by performing a minimum required additional operation.

Further, in Embodiment 1, the voice recognition unit 11 is configured so as to recognize an uttered voice acquired during a predetermined voice acquisition time period. As mentioned above, according to Embodiment 1, because a malfunction can be prevented, voice recognition can be always performed during the voice acquisition time period, and therefore the user can cause a function to be performed without providing an instruction to start voice recognition.

Embodiment 2

In above-mentioned Embodiment 1, when the degree of performance of a function corresponding to a recognition result is less than the first reference and is greater than the second reference, function candidates are presented and an inquiry about which function is to be performed is made to the user. In contrast, in this Embodiment 2, the content of the inquiry is changed in accordance with the presence or absence of a user's operational intention.

Figure 4:
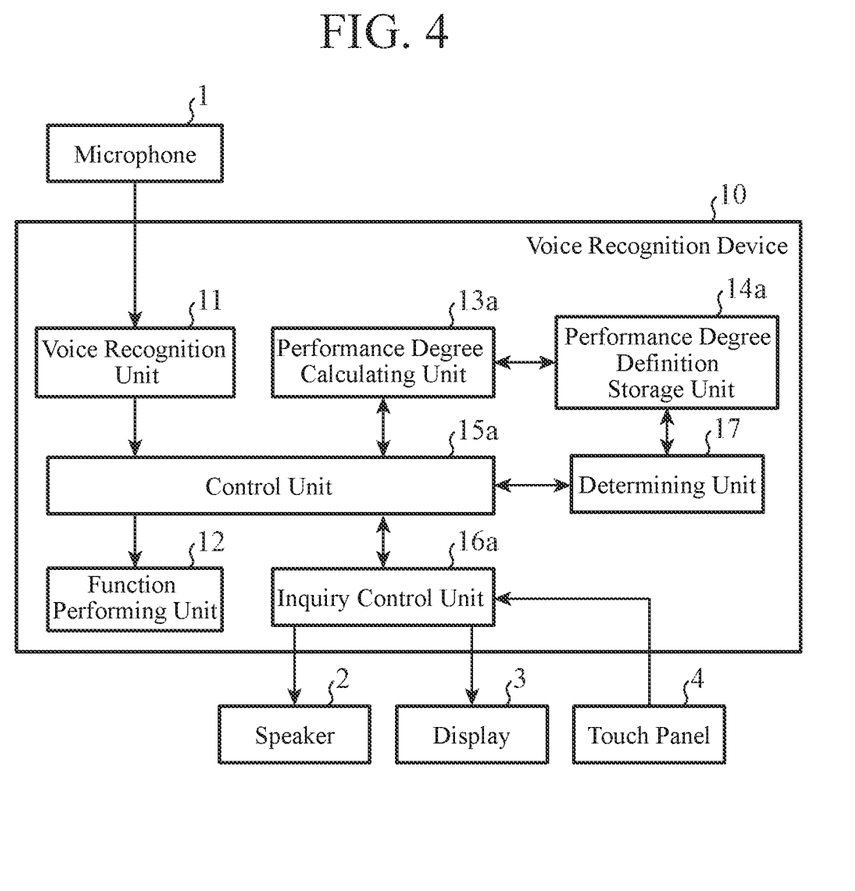
FIG. 4 is a block diagram showing an example of the configuration of a voice recognition device according to Embodiment 2 of the present invention.

FIG. 4 is a block diagram showing an example of the configuration of a voice recognition device 10 according to Embodiment 2 of the present invention. The voice recognition device 10 according to Embodiment 2 has a configuration in which a determining unit 17 is added to the voice recognition device 10 of Embodiment 1 shown in FIG. 1. In FIG. 4, the same components as those shown in FIG. 1 or corresponding components thereto are denoted by the same reference numerals, and an explanation of the components will be omitted hereafter.

In Embodiment 2, a performance degree calculating unit 13a calculates the degree of performance of a function corresponding to a recognition result provided by a voice recognition unit 11, by reference to a performance degree definition storage unit 14a. Here, an example of correspondence between the degrees of performance of a function and operations which the voice recognition device 10 performs is shown in FIG. 5.

Figure 5:
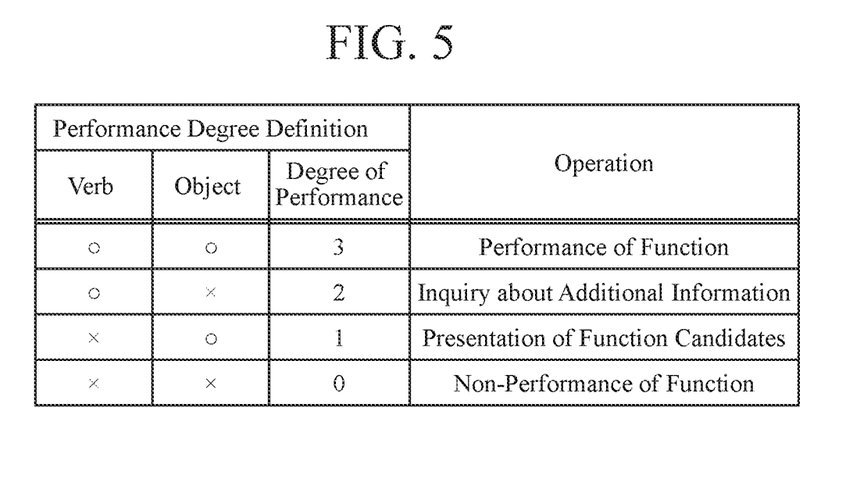
FIG. 5 is a diagram showing correspondence between degrees of performance and operations in Embodiment 2.

In an example of the "performance degree definition" shown in FIG. 5, the degree of performance of an object which is a word showing the purpose of a function has a lower value than that of the degree of performance of a verb which is a word showing the operation of the function. Further, a degree of performance of "3" is set as a first reference and a degree of performance of "0" is set as a second reference.

The determining unit 17 receives a recognition result from a control unit 15a and determines the presence or absence of a verb and the presence or absence of an object in the recognition result by reference to the performance degree definition storage unit 14a, thereby determining whether or not the user has an intention of operating vehicle-mounted equipment. The determining unit 17 then outputs a result of the determination to the control unit 15a.

In the voice recognition device 10 according to Embodiment 1, when the degree of performance is equal to or greater than the first reference, it is determined that the user's intention of operating vehicle-mounted equipment is clear, whereas when the degree of performance is less than the first reference, it is determined that the user's intention of operating vehicle-mounted equipment is not clear.

In contrast, in this Embodiment 2, when a verb exists in the recognition result and this recognition result can be brought into correspondence with a function which a function performing unit 12 can perform, the determining unit 17 determines that the user has an intention of operating vehicle-mounted equipment. In contrast, when no verb exists in the recognition result or when this recognition result cannot be brought into correspondence with a function and only an object exists, the determining unit 17 determines that the user does not have an intention of operating vehicle-mounted equipment.

Hereafter, the operation of the voice recognition device 10 according to Embodiment 2 will be explained using a flowchart of FIG. 6. The voice recognition device 10 performs processing shown in the flowchart of FIG. 6 during a predetermined voice acquisition time period mentioned above.

Figure 3:
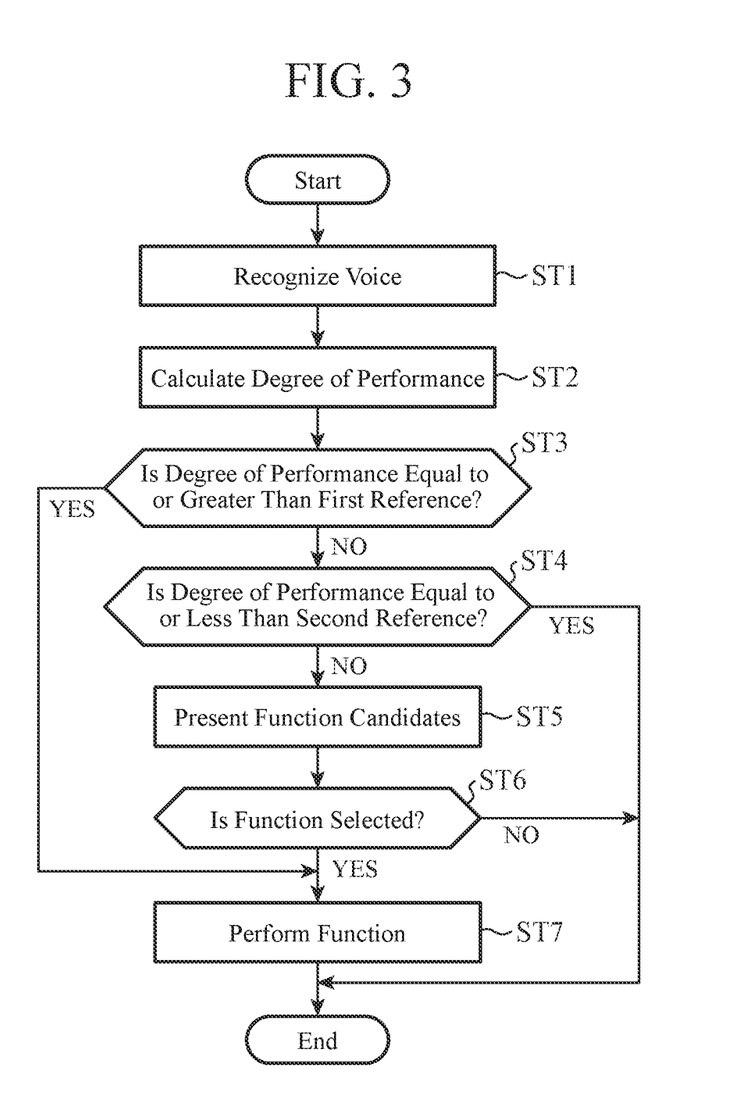
FIG. 3 is a flowchart for explaining the operation of the voice recognition device according to Embodiment 1.
Figure 6:
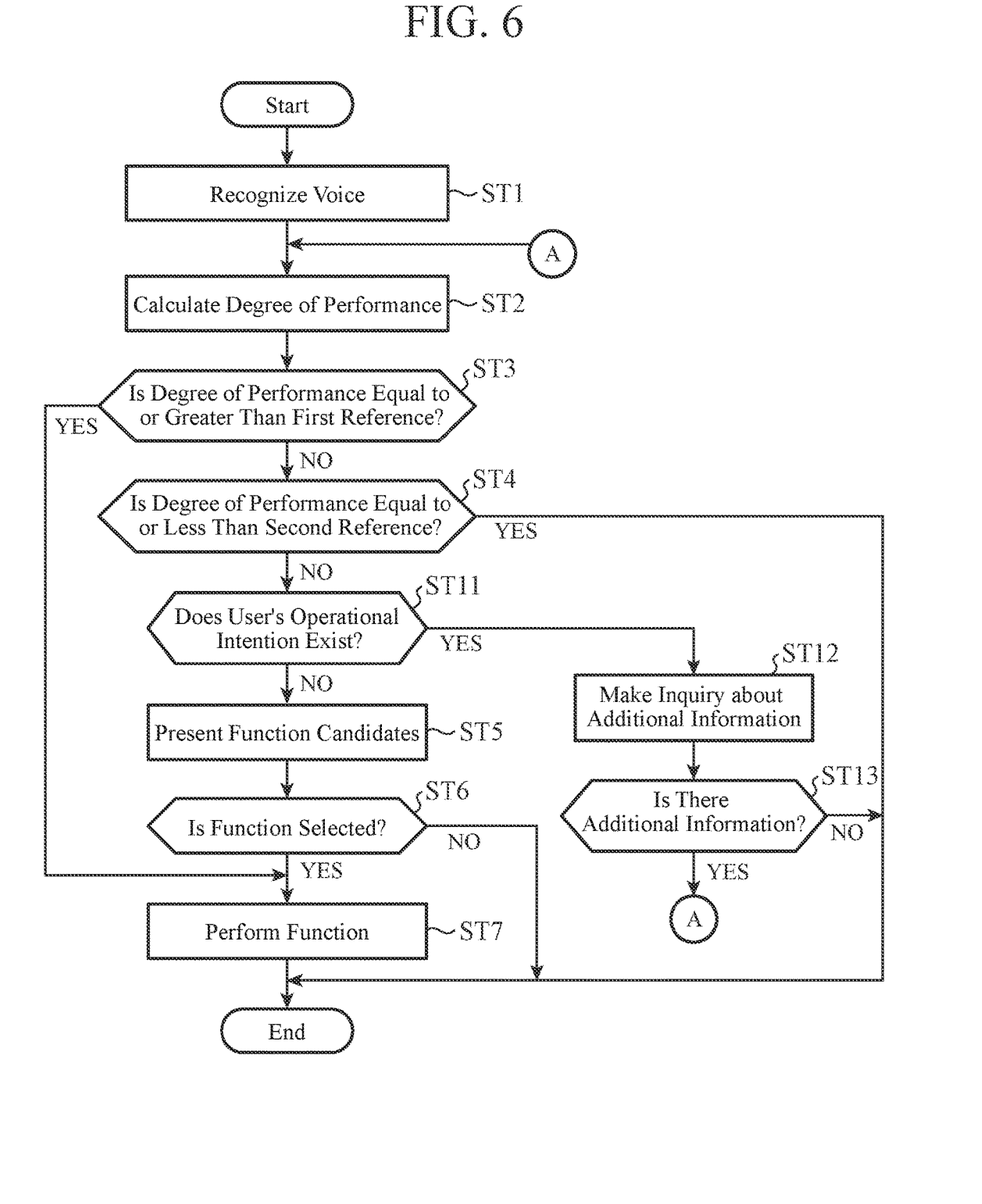
FIG. 6 is a flowchart for explaining the operation of the voice recognition device according to Embodiment 2.

Because processes in steps ST1 to ST7 of FIG. 6 are the same as those in steps ST1 to ST7 of FIG. 3 in Embodiment 1, an explanation of the processes will be omitted hereafter.

When the degree of performance of a function corresponding to a recognition result is less than the first reference of "3" ("NO" in step ST3) and is greater than the second reference of "0" ("NO" in step ST4), the control unit 15a advances to step ST11 and outputs this recognition result to the determining unit 17. The determining unit 17 receives the recognition result from the control unit 15a, determines the presence or absence of the user's operational intention, and outputs a result of the determination to the control unit 15a. The control unit 15a receives the determination result from the determining unit 17.

When the user's operational intention does not exist ("NO" in step ST11), the control unit 15a advances to step ST5. In contrast, when the user's operational intention exists ("YES" in step ST11), the control unit 15a advances to step ST12 and instructs an inquiry control unit 16a to make an inquiry about additional information required to perform this function. The inquiry control unit 16a makes an inquiry to the user about additional information by using a speaker 2 or a display 3, in accordance with the instruction from the control unit 15a.

In step ST13, when receiving additional information which is a result of the inquiry from the inquiry control unit 16a or the voice recognition unit 11 ("YES" in step ST13), the control unit 15a advances to step ST2 and outputs this additional information to the performance degree calculating unit 13a. The performance degree calculating unit 13a combines the first recognition result and the additional information, thereby calculating the degree of performance again.

In contrast, when additional information which is a result of the inquiry is notified from neither the inquiry control unit 16a nor the voice recognition unit 11 before a predetermined time period elapses after the inquiry control unit 16a has been instructed to make an inquiry about additional information ("NO" in step ST13), the control unit 15a ends the processing. At that time, the inquiry control unit 16a ends the display of the inquiry about additional information on the display 3.

For example, when the recognition result is "I want to listen to music", because an audio playback function can be brought into correspondence with the verb "want to listen", but a concrete parameter is not known from "music", the degree of performance is determined as "2." In this case, the control unit 15a instructs the inquiry control unit 16a to make an inquiry of "Please tell the title of the music which you want to listen to" or the like. When the user utters a music title in response to this inquiry, the control unit 15a acquires additional information about the music title by using either an input device such as a touch panel 4, or a voice input through a microphone 1 and the voice recognition unit 11. The performance degree calculating unit 13a then calculates the degree of performance of the audio playback function again, by using the recognition result which is "I want to listen to music", and the additional information about the music title. In the case of this example, because the degree of performance which is calculated again is "3", the control unit 15a outputs an instruction to play back the music to the function performing unit 12.

When a function can be performed even though an object in the recognition result is not clear, the control unit 15a can cause the function to be performed before making an inquiry.

Hereafter, another example of the operation of the voice recognition device 10 according to Embodiment 2 will be explained using a flowchart of FIG. 7.

In step ST21, when the user's operational intention does not exist ("NO" in step ST21), the control unit 15a advances to step ST5. In contrast, when the user's operational intention exists ("YES" in step ST21), the control unit 15a advances to step ST22, and instructs the function performing unit 12 to perform a function having the highest performance priority among function candidates corresponding to the recognition result. The function performing unit 12 performs the function having the highest performance priority in accordance with the instruction from the control unit 15a.

For example, when the recognition result is only a verb "increase", the control unit 15a defines a map enlarging function for car navigation, a sound volume changing function for car audio, a temperature changing function for car air conditioner, and so on which correspond to the verb, as candidates, and causes the function having the highest performance priority among the candidates to be performed.

The performance priority of a function can be defined in advance in such a way that the priority of the function which has small influence on the user when being performed becomes higher, or can be determined by the control unit 15a on the basis of the frequency with which the function is used by the user.

In step ST23, the control unit 15a instructs the inquiry control unit 16a to present the performed function and make an inquiry about the presence or absence of correction to this function. The inquiry control unit 16a performs presentation of the performed function and makes an inquiry about the presence or absence of correction to this function by using the speaker 2 or the display 3, in accordance with the instruction from the control unit 15a. At that time, the inquiry control unit 16a can present function candidates which have a low performance priority and have not been performed, thereby enabling the user to make a selection.

In step ST24, when receiving a recognition result or the like which instructs that a function other than the performed function is to be performed, as an inquiry result from either the inquiry control unit 16a or the voice recognition unit 11 ("YES" in step ST24), the control unit 15a advances to step ST2 and instructs the performance degree calculating unit 13a to calculate the degree of performance of a function corresponding to the new recognition result. At that time, the control unit 15a outputs an instruction to cancel the performance of the function which has been performed previously to the function performing unit 12.

As an alternative, when receiving a recognition result or the like which instructs that a function other than the performed function is to be performed ("YES" in step ST24), the control unit 15a can instruct the function performing unit 12 to perform a function corresponding to the recognition result or the like.

In contrast, when an inquiry result is notified from neither the inquiry control unit 16a nor the voice recognition unit 11 before a predetermined time period elapses after the inquiry control unit 16a has been instructed to make an inquiry about the presence or absence of correction to the performed function ("NO" in step ST24), the control unit 15a ends the processing. At that time, the inquiry control unit 16a ends the display of the inquiry on the display 3.

As mentioned above, the voice recognition device 10 according to Embodiment 2 is configured so as to include the determining unit 17 that determines the presence or absence of a user's operational intention by using a recognition result provided by the voice recognition unit 11, and the inquiry control unit 16a that makes an inquiry to the user. Then, when the degree of performance calculated by the performance degree calculating unit 13a is greater than the second reference and is less than the first reference, the inquiry control unit 16a changes the content of the inquiry in accordance with a determination result provided by the determining unit 17.

Concretely, when the determining unit 17 determines that there is an operational intention, the inquiry control unit 16a makes an inquiry about additional information required for the function performing unit 12 to perform a function. In contrast, when the determining unit 17 determines that there is no operational intention, the inquiry control unit 16a presents candidates for a function which is based on the recognition result and which the function performing unit 12 can perform, and the control unit 15a causes the function performing unit 12 to perform a function which is selected by the user from among the presented function candidates. As a result, the user can cause a function to be performed by performing a minimum required additional operation.

The performance degree calculating unit 13a can make an inquiry about information required to perform the function which is selected by the user from among the presented function candidates.

Figure 7:
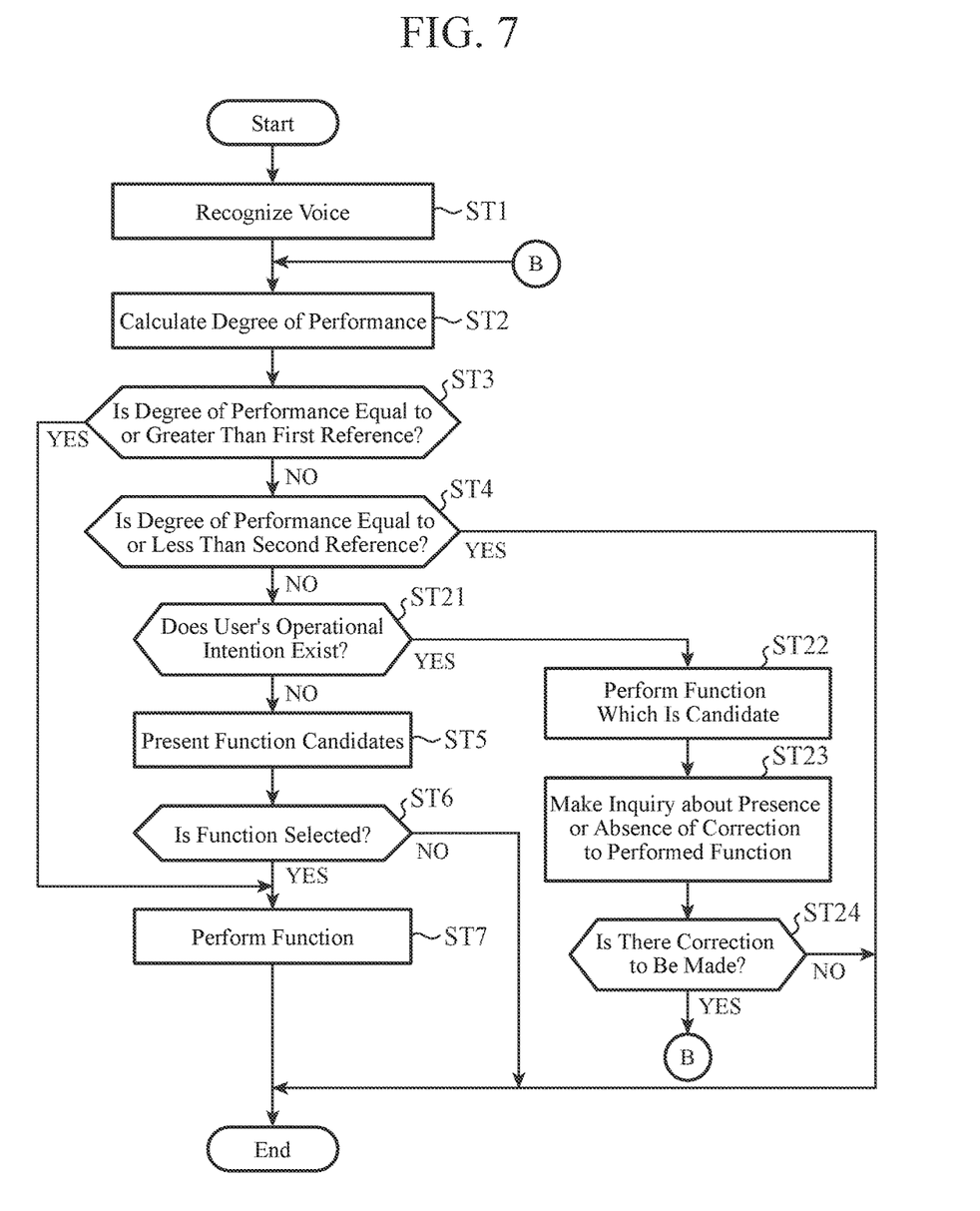
FIG. 7 is a flowchart for explaining another example of the operation of the voice recognition device according to Embodiment 2.

For example, in step ST7 shown in the flowcharts of FIGS. 6 and 7, when it is determined that the information required to perform the function which is selected by the user from among the presented function candidates is insufficient at the time when the function is performed, the performance degree calculating unit 13a makes an inquiry to the user about additional information.

Further, as shown in FIG. 7 of Embodiment 2, there can be provided a configuration in which when the degree of performance calculated by the performance degree calculating unit 13a is greater than the second reference and is less than the first reference, and the determining unit 17 determines that there is an operational intention, the control unit 15a causes the function performing unit 12 to perform the function, and the inquiry control unit 16a makes an inquiry about whether or not to correct the function which the function performing unit 12 has performed. As a result, when the function can be performed even without additional information, the user can cause the function to be performed without performing an additional operation.

Further, according to Embodiment 2, the control unit 15a is configured so as to prevent a function corresponding to a recognition result from being performed when the degree of performance calculated by the performance degree calculating unit 13a is equal to or less than the second reference. By preventing a function having a remarkably low degree of performance from being performed, a malfunction different from the user's intention can be prevented.

Figure 8:
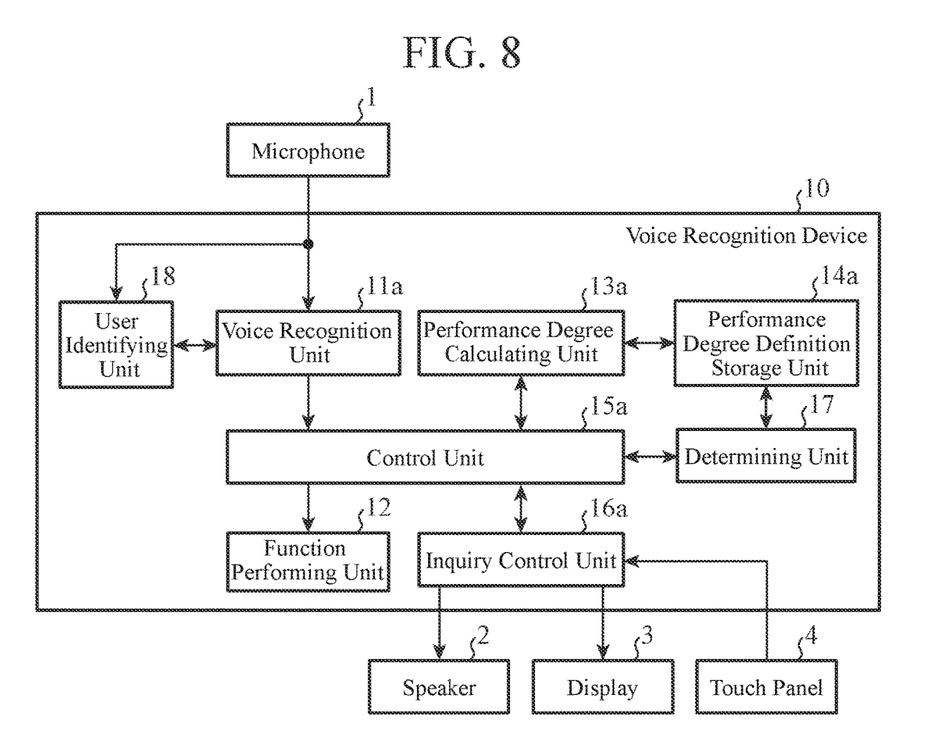
FIG. 8 is a block diagram showing a variant of the voice recognition device according to Embodiment 2.

Next, a variant of the voice recognition device 10 according to Embodiment 2 is shown in FIG. 8.

The voice recognition device 10 shown in FIG. 8 has a configuration in which a user identifying unit 18 is added to the voice recognition device 10 of Embodiment 2 shown in FIG. 4. In FIG. 8, the same components as those shown in FIGS. 1 and 4 or corresponding components thereto are denoted by the same reference numerals, and an explanation of the components will be omitted hereafter.

The user identifying unit 18 identifies a user who has given utterance, and provides a notification for a voice recognition unit 11a. When the inquiry control unit 16a makes an inquiry in step ST12 shown in the flowchart of FIG. 6 or in step ST23 shown in the flowchart of FIG. 7, the voice recognition unit 11a performs recognition processing on the utterance provided by the user identified by the user identifying unit 18, and outputs a recognition result as an inquiry result. As a result, the inquiry control unit 16a can perform interaction with the user identified by the user identifying unit 18. Hereafter, an example of the interaction with the identified user will be explained.

For example, the user identifying unit 18 acquires voice data from the microphone 1 and identifies a user who has given utterance by performing voiceprint identification, and the voice recognition unit 11a selectively acquires voice data about the identified user who has given utterance and performs recognition processing. As an alternative, the user identifying unit 18 acquires voice data from two or more microphones 1 and specifies the direction of the user who has given utterance by performing sound source localization, or acquires a face image shot by a not-illustrated camera and specifies the direction of the user who has given utterance, and the voice recognition unit 11a selectively acquires voice data about a voice coming from the direction of the user who has given utterance by performing beamforming, and performs recognition processing. As a result, a malfunction of the voice recognition device 10 which is caused by utterance provided by a passenger in the vehicle other than the identified user can be prevented.

Further, for example, the voice recognition unit 11a can perform adaptation corresponding to the user who has given utterance and whom the user identifying unit 18 has identified. The voice recognition unit 11a has a voice recognition dictionary, an acoustic model, a language model, or the like for each user, and switches among the voice recognition dictionaries or the likes in accordance with the user who has given utterance and whom the user identifying unit 18 has identified. Further, in order to generate a voice recognition dictionary or the like for each user, the voice recognition unit 11a can perform learning for each user who has given utterance and whom the user identifying unit 18 has identified. As a result, the recognition accuracy at the time of inquiry can be increased, and a malfunction of the voice recognition device 10 which is caused by misrecognition can be prevented.

Further, for example, the control unit 15a can change the performance priority in step ST22 shown in the flowchart of FIG. 7, in accordance with the user who has given utterance and whom the user identifying unit 18 has identified.

The user identifying unit 18 can be added to the voice recognition device 10 of Embodiment 1 shown in FIG. 1. In this case, when the inquiry control unit 16 presents function candidates and makes an inquiry in step ST5 shown in the flowchart of FIG. 3, the voice recognition unit 11 can perform recognition processing on the utterance provided by the user whom the user identifying unit 18 has identified, and output a recognition result as an inquiry result.

Finally, an example of the hardware configuration of the voice recognition device 10 according to each of the embodiments of the present invention will be explained by reference to FIG. 9.

Figure 9:
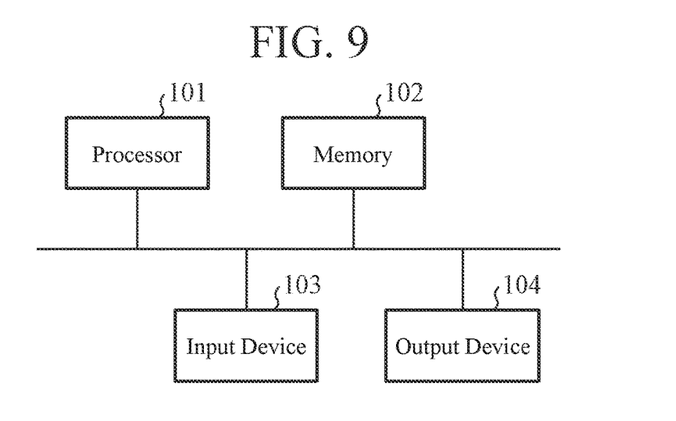
FIG. 9 is a diagram of the hardware configuration of the voice recognition device according to each of the embodiments of the present invention.

The microphone 1 and the touch panel 4 shown in FIGS. 1, 4, and 8 are an input device 103 shown in FIG. 9. The speaker 2 and the display 3 are an output device 104. The voice recognition unit 11 or 11a, the function performing unit 12, the performance degree calculating unit 13 or 13a, the control unit 15 or 15a, the inquiry control unit 16 or 16a, the determining unit 17, and the user identifying unit 18 in the voice recognition device 10 are a processor 101 that executes a program stored in a memory 102. The performance degree definition storage unit 14 or 14a is the memory 102.

The functions of the voice recognition unit 11 or 11a, the function performing unit 12, the performance degree calculating unit 13 or 13a, the control unit 15 or 15a, the inquiry control unit 16 or 16a, the determining unit 17, and the user identifying unit 18 are implemented by software, firmware, or a combination of software and firmware. Software or firmware is described as a program and the program is stored in the memory 102. The processor 101 implements the function of each of the units by reading and executing a program stored in the memory 102. More specifically, the voice recognition device 10 includes the memory 102 for storing a program in which each of the steps shown in FIG. 3, 6, or 7 is performed as a result of execution of the program by the processor 101. Further, it can also be said that this program causes a computer to perform a procedure or a method which each of the units of the voice recognition device 10 uses.

The processor 101 is also referred to as a Central Processing Unit (CPU), a processing device, an arithmetic device, a microprocessor, a microcomputer, a Digital Signal Processor (DSP), or the like. The memory 102 is, for example, a non-volatile or volatile semiconductor memory such as a Random Access Memory (RAM), a Read Only Memory (ROM), a flash memory, an Erasable Programmable ROM (EPROM), or an Electrically EPROM (EEPROM), a magnetic disc such as a hard disc or a flexible disc, or an optical disc such as a mini disc, a Compact Disc (CD), or a Digital Versatile Disc (DVD).

In the configuration according to either of above-mentioned Embodiments 1 and 2, the performance degree calculating unit 13 or 13a calculates a degree of performance from a recognition result provided by the voice recognition unit 11 or 11a, and the control unit 15 or 15a determines a subsequent operation in accordance with the degree of performance. In addition to the configuration, when a specific command is uttered, an operation corresponding to the command can be performed.

For example, the control unit 15 or 15a can be configured so as to, when an operation of "performing a function of playing back the first piece of music" is defined in advance for a command "audio" in the control unit 15 or 15a, start a playback of the first piece of music when the user utters "audio."

In addition, as an operation for each command, not only "performance of a function", but also "inquiry about additional information", "presentation of function candidates", or the like can be defined. More specifically, as the operation for the utterance of "audio", instead of "uniformly playback of the first piece of music", an operation of playing back a target piece of music after making an inquiry of "Whose piece of music will be played back?", "Which piece of music will be played back?", or the like can be defined.

It is to be understood that any combination of two or more of the above-mentioned embodiments can be made, various changes can be made in any component of each of the above-mentioned embodiments, and any component of each of the above-mentioned embodiments can be omitted within the scope of the invention.

Further, although in Embodiments 1 and 2 the use in which the voice recognition device 10 is mounted in a vehicle is explained, the voice recognition device can be used for uses other than the in-vehicle use.

INDUSTRIAL APPLICABILITY

Because when the degree to which a function corresponding to a recognition result can be performed is equal to or greater than the first reference, the voice recognition device according to the present invention performs the function; otherwise, the voice recognition device does not perform the function immediately, thereby preventing a malfunction from occurring, the voice recognition device is suitable for use as a voice recognition device or the like that recognizes a voice at all times.

REFERENCE SIGNS LIST

1 microphone, 2 speaker, 3 display, 4 touch panel, 10 voice recognition device, 11 and 11a voice recognition unit, 12 function performing unit, 13 and 13a performance degree calculating unit, 14 and 14a performance degree definition storage unit, 15 and 15a control unit, 16 and 16a inquiry control unit, 17 determining unit, 18 user identifying unit, 101 processor, 102 memory, 103 input device, and 104 output device.

The invention claimed is:
1. A voice recognition device comprising:
a processor; and
a memory storing instructions which, when executed by the processor, performs a process including,
recognizing a user's uttered voice,
calculating a degree to which the recognition result corresponds to one of a plurality of functions which the processor is programmed to perform,
when the calculated degree is equal to or greater than a predetermined first reference which is used for determining whether there is sufficient information required for the function performer to perform the function, performing the function corresponding to the recognition result,
when the calculated degree is less than the first reference, but greater than a predetermined second reference,
analyzing the recognition result to determine presence or absence of a user's operational intention, wherein the analysis determines the presence of a user's operational intention based on whether or not the recognition result includes a verb corresponding to a subset of the functions which the processor is programmed to perform; and
when the analysis determines the presence of a user's operational intention, presenting a user with the subset of functions as candidate functions, and making an inquiry with the user as to whether any of the candidate functions is to be performed by the processor; and when the analysis determines the absence of a user's operational intention, making a different inquiry to the user about information required for the processor to perform a function desired by the user.

2. The voice recognition device according to claim 1, wherein the process one of the plurality of functions by using information which is acquired through the different inquiry.

3. The voice recognition device according to claim 1,
wherein when the calculated degree is greater than the second reference and is less than the first reference, and the process determines the presence of an operational intention, the process performs one of the subset of functions, and
an inquiry is made about whether or not to correct the function which has been performed.

4. The voice recognition device according to claim 1, wherein the process further comprises
identifying a user who has given the utterance, and
performing interaction with the user that has been identified.

5. The voice recognition device according to claim 4, wherein voice interaction is performed with the user that has been identified.

6. The voice recognition device according to claim 4, wherein voice recognition is adapted to the user that has been identified.

7. The voice recognition device according to claim 1, wherein when the process determines that there is no operational intention, the process presents candidates for a function which is based on the recognition result and which the processor can perform.

8. The voice recognition device according to claim 7, wherein the process makes an inquiry about information required to perform a function which is selected by the user from among the presented candidate functions.

9. The voice recognition device according to claim 7, wherein the process causes the processor to perform a function which is selected by the user from among the candidate functions presented.

10. The voice recognition device according to claim 1, wherein the process recognizes an uttered voice which is acquired during a predetermined voice acquisition time period.

11. The voice recognition device according to claim 1, wherein when the calculated degree is equal to or less than the second reference, the process prevents a function corresponding to the recognition result from being performed.

12. The voice recognition device according to claim 1, wherein the process calculates the degree of performance of a verb showing an operation of the function so that the degree of performance of the verb has a higher value than that of the degree of performance of an object showing the purpose of the function.

* * * * *